US012601637B2

(12) United States Patent
Simolon et al.

(10) Patent No.: US 12,601,637 B2
(45) Date of Patent: Apr. 14, 2026

(54) VACUUM HEALTH DETECTION FOR IMAGING SYSTEMS AND METHODS

(71) Applicant: Teledyne FLIR Commercial Systems, Inc., Goleta, CA (US)

(72) Inventors: Brian B. Simolon, Goleta, CA (US); Naseem Y. Aziz, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 594 days.

(21) Appl. No.: 18/156,737

(22) Filed: Jan. 19, 2023

(65) Prior Publication Data

US 2023/0160751 A1 May 25, 2023

Related U.S. Application Data

(63) Continuation of application No. PCT/US2021/042440, filed on Jul. 20, 2021.

(60) Provisional application No. 63/054,729, filed on Jul. 21, 2020.

(51) Int. Cl.
| | |
|---|---|
| *G01J 5/22* | (2006.01) |
| *H04N 25/21* | (2023.01) |
| *H04N 25/767* | (2023.01) |
| *H04N 25/78* | (2023.01) |

(52) U.S. Cl.
CPC ............... *G01J 5/22* (2013.01); *H04N 25/21* (2023.01); *H04N 25/767* (2023.01); *H04N 25/78* (2023.01)

(58) Field of Classification Search
CPC ......... G01J 5/22; H04N 25/21; H04N 25/767; H04N 25/78
See application file for complete search history.

(56) References Cited

U.S. PATENT DOCUMENTS

| | | | |
|---|---|---|---|
| 7,385,199 B2 | 6/2008 | DeWames et al. | |
| 8,471,206 B1 | 6/2013 | Kostrzewa et al. | |
| 8,748,808 B2 | 6/2014 | Noc et al. | |
| 9,606,016 B2 | 3/2017 | Kurth | |
| 10,197,448 B2 | 2/2019 | Simolon et al. | |
| 10,553,454 B2 | 2/2020 | Schweikert et al. | |
| 2014/0219308 A1* | 8/2014 | Kurth | G01L 21/12 |
| | | | 374/2 |

(Continued)

FOREIGN PATENT DOCUMENTS

| | | |
|---|---|---|
| KR | 101383918 B1 | 4/2014 |
| WO | WO 2010/023654 A1 | 3/2010 |
| WO | WO 2022/020396 A1 | 1/2022 |

*Primary Examiner* — Edwin C Gunberg
*Assistant Examiner* — Richard O Toohey
(74) *Attorney, Agent, or Firm* — Haynes and Boone, LLP

(57) ABSTRACT

Techniques for facilitating vacuum health detection for imaging systems and methods are provided. In one example, an imaging device includes a detector configured to generate a first reference signal. The imaging device further includes a buffer circuit configured to store a value of the first reference signal. The imaging device further includes a processing circuit coupled to the buffer circuit. The processing circuit is configured to determine a first predetermined value based on a first temperature associated with the detector. The processing circuit is further configured to determine vacuum integrity associated with the detector based at least on the value of the first reference signal and the first predetermined value. Related methods and systems are also provided.

20 Claims, 9 Drawing Sheets

(56) References Cited

U.S. PATENT DOCUMENTS

2017/0219436 A1 * 8/2017 Simolon ................... G01J 1/44

* cited by examiner

300

310

315

305

400

| Blind Bolometer 405 | → | Buffer Circuit 410 | → | Analog-to-Digital Converter 415 | → | Vacuum Health Detection Device 420 |

$T_{sub}$

VACUUM HEALTH DETECTION FOR IMAGING SYSTEMS AND METHODS

CROSS-REFERENCE TO RELATED APPLICATIONS

This application is a continuation of International Patent Application No. PCT/US2021/042440 filed Jul. 20, 2021 and entitled "VACUUM HEALTH DETECTION FOR IMAGING SYSTEMS AND METHODS," which claims the benefit of and priority to U.S. Patent Application No. 63/054,729 filed Jul. 21, 2020 and entitled "VACUUM HEALTH DETECTION FOR IMAGING SYSTEMS AND METHODS," all of which are incorporated herein by reference in their entirety.

TECHNICAL FIELD

One or more embodiments relate generally to imaging and more particularly, for example, to vacuum health detection for imaging systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging device includes a detector configured to generate a first reference signal. The imaging device further includes a buffer circuit configured to store a value of the first reference signal. The imaging device further includes a processing circuit coupled to the buffer circuit. The processing circuit is configured to determine a first predetermined value based on a first temperature associated with the detector. The processing circuit is further configured to determine vacuum integrity associated with the detector based at least on the value of the first reference signal and the first predetermined value.

In one or more embodiments, a method includes generating, by a detector, a first reference signal. The method further includes storing, by a buffer circuit, a value of the first reference signal. The method further includes determining, by a processing circuit, a first predetermined value based on a first temperature associated with the detector. The method further includes determining, by the processing circuit, vacuum integrity associated with the detector based at least on the value of the first reference signal and the first predetermined value.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
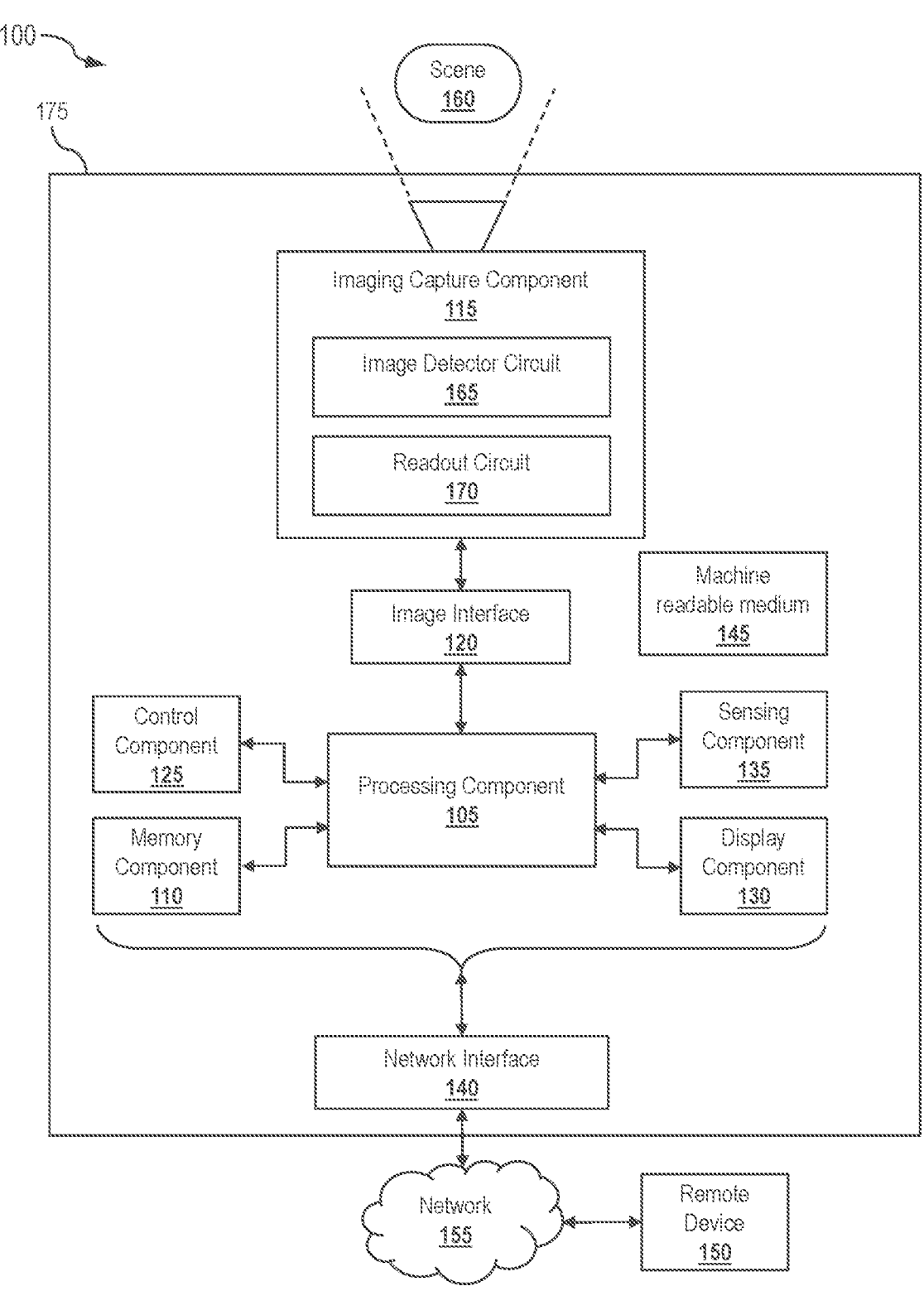
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are provided to facilitate vacuum health detection. In various embodiments, the imaging systems and methods may use bolometer-based detectors. An imaging device according to various embodiments may include an FPA having detectors and a readout circuit. Detectors may also be referred to as detector pixels, detector elements, or simply pixels or elements. Each detector may capture a portion of an incident scene (e.g., incident EM radiation) and generate an associated detector output. The detector output may be an electrical signal (e.g., a voltage or photocurrent) and may be referred to as a pixel output or image data. The readout circuit performs a readout to obtain image data from each of the detectors indicative of the EM radiation detected by the detectors.

In some aspects, the FPA may include active unit cells and reference unit cells. Each active unit cell may include a detector. Each reference unit cell may include a detector and a structure (e.g., shutter, lid, cover, paddle) or portion thereof that selectively blocks the detector of the reference unit cell from the scene incident (e.g., incident or external radiation, such as thermal radiation) on the unit cell array. The structure may be used to provide/present a uniform scene to the detectors of the reference unit cells. The detectors of the reference unit cells are effectively blinded from the scene. As such, a reference unit cell and its detector may be referred to as a blind unit cell and a blind detector, respectively.

The FPA (e.g., active and blind detectors and readout circuit) may be situated within a vacuum package to provide a high vacuum environment that facilitates achieving of a desired sensitivity from the detectors. Vacuum integrity may degrade over time due to various factors, such as outgassing and/or leaks. For instance, when vacuum is lost, air and/or other gases may enter the sensor cavity and adversely affect the detector's thermal isolation. Such degradation in vacuum integrity may result in a gradual loss of vacuum pressure and consequently a reduction in sensitivity and overall performance of the FPA. The reference detectors of the FPA are shielded from incident or external radiation and, similar to the active detectors, are substantially thermally isolated from a substrate. The active detectors and reference detectors may share various properties, such as operating within the same vacuum cavity and sharing noise properties (e.g., temporal noise properties).

In some embodiments, an integrity of the vacuum may be determined by saving/storing a value of a reference signal $V_{REF}$ generated by the blind detectors. In an aspect, the reference signal $V_{REF}$ may be referred to as a bias-setting reference signal. The reference signal $V_{REF}$ may be used to compensate for self-heating (e.g., pulse-bias heating) of the active detectors. As such, the reference signal $V_{REF}$ may also be referred to as a compensation signal or an anti-ramp signal (e.g., to compensate for a ramp/slope associated with self-heating). In some cases, a reference signal may be generated for each line of the active detectors. For example, when the detector array is read out row by row, a line may refer to a row. The reference signal $V_{REF}$ may have a different slope over temperature. In an embodiment, the temperature may be a temperature of the readout circuit (e.g., ROIC) of the FPA, which may also be referred to as an ambient temperature or a substrate temperature. In an aspect, hotter temperatures are associated with higher pulse-biased heating and thus larger slope. When a vacuum that an FPA and detectors are in is of high quality, the reference signal $V_{REF}$ has a larger slope as the pulse-bias heating is not degraded by a thermal shunt to air. As the vacuum degrades, the slope of the reference signal $V_{REF}$ buffered to the detectors flattens. In this regard, as the vacuum degrades, the pixels may become thermally shunted to the temperature of the air around the pixels, thus causing a degradation in the response of the pixels to the scene.

During calibration (e.g., in the factory), since an end value of the reference signal $V_{REF}$ changes not only vacuum but also with temperature, the value of the reference signal $V_{REF}$ for temperatures (e.g., ROIC temperatures) within an operating temperature range of the imaging device in the case of a high quality vacuum may be determined and saved. Such values of the reference signals $V_{REF}$ may be referred to as expected reference signal values or calibrated reference signal values. For example, a lookup table, an equation, and/or other data structure/relation may be used to store and/or compute values of the reference signal $V_{REF}$ for temperatures within the operating temperature range.

In the field, for blind detectors at a given temperature (e.g., measured by a temperature sensor of or otherwise coupled to the imaging device), if a value of the reference signal $V_{REF}$ generated by the blind detector(s) deviates beyond a threshold amount from the expected reference signal value at that temperature, a vacuum that the active and blind detectors are in may be determined to have degraded significantly. In various aspects, the ROIC temperature may be considered a temperature of the blind detectors. The threshold amount may be selected based on application (e.g., requirements associated with image data integrity), cost considerations, and so forth. For example, the threshold amount may be associated with a certain amount/percentage loss of vacuum (e.g., 10% loss of vacuum). In some cases, when such a deviation is detected, imaging system electronics may raise a flag to warn the imaging device and/or the user that the detectors may have degraded performance (e.g., image data generated by the detectors may be degraded) due to a loss/degradation of vacuum. If the value of the reference signal $V_{REF}$ generated by the blind detector(s) has a deviation within the threshold amount from the expected reference signal value at the temperature, the vacuum may be determined to have not degraded significantly (e.g., not have degraded to an extent that needs user or imaging device attention), although the deviation may be stored and/or reported (e.g., to the imaging system electronics and/or user) for monitoring.

In general, vacuum integrity monitoring/verification of the imaging device may be performed to detect a presence or an absence of error states (e.g., also referred to as failure modes) and report diagnostics (e.g., to the user). It is noted that, in some cases, detection of a presence or an absence of an error state(s) may be associated with one or more confidence levels. Such a confidence level(s) may be an indication(s) of a probability of a false positive and a false negative. Such vacuum integrity verification of the imaging device may be performed to ensure image data provided by the imaging device is not corrupt. Corrupted image data may result in false positives and/or failures in various applications, such as failures to detect objects in an autonomous vehicle's perception system for autonomous vehicle applications. The reported diagnostics may facilitate mitigation of any detected error states.

The user may be alerted of a detected error state(s) using a notification (e.g., a diagnostic flag), such that the user may troubleshoot and/or perform mitigation actions. In an aspect, the diagnostic flag may be or may cause a general-purpose input/output (GPIO) interrupt sent to appropriate circuitry. As non-limiting examples, mitigation actions may include adjust processing performed by the imaging device (e.g., by a processor of the imaging device) due to the loss of vacuum, resetting the imaging device (or portion thereof) to determine if the error is a transient fault, cycling power associated with the imaging device (or portion thereof) to determine if the error is a transient fault, or replace the imaging device (e.g., replace a camera containing the imaging device with a different camera). An error state(s) may be communicated to the user via, by way of non-limiting examples, a display on a user device (e.g., mobile phone), a display on a camera that includes the imaging device, and/or via other manners. Such an alert may be a visible alert, such as text or pulses of light emitted by light emitting diodes communicatively coupled to the imaging device, and/or an audible alert, such as beeping by a speaker communicatively coupled to the imaging device.

Various embodiments of methods and systems disclosed herein may be included in or implemented as various devices and systems such as visible-light imaging systems, infrared imaging systems (e.g., thermal infrared imaging systems), imaging systems having visible-light and infrared imaging capability, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The processing component 105 may perform operations to process pixel values received (e.g., as part of frames) from a readout circuit 170 of the imaging capture component 115. By way of non-limiting example, the processing component 105 may perform operations such as non-uniformity correction (NUC) (e.g., flat field correction (FFC) or other calibration technique), spatial and/or temporal filtering, and/or radiometric conversion on the pixel values. The processing component 105 may include combinations of hardware and software processing functionality and may be provided with/in and/or communicatively coupled to other components to execute appropriate instructions, such as software instructions and/or processing parameters (e.g., filtering coefficients, NUC correction terms) stored in the memory component 110. In various embodiments, the processing component 105 may be configured to execute software instructions stored in the memory component 110 to perform various methods, processes, or operations in the manner described herein. In some aspects, the readout circuit 170 and/or processing component 105 may include and/or may be coupled to circuitry to generate and provide timing/clock signals and/or control signals for facilitating readout of image data captured by an image detector circuit 165 of the imaging capture component 115. As an example, such a signal may include an $F_{SYNC}$ signal associated with a start of an image and/or an end of frame (EOF) associated with an end of the image.

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the imaging capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes the image detector circuit 165 (e.g., a thermal infrared detector circuit) and the readout circuit 170 (e.g., an ROIC). In some cases, the image capture component 115 does not have a shutter, such that the image detector circuit 165 is exposed to a scene encompassed by a field of view of the image capture component 115. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to a ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), short-wave IR (SWIR), MWIR, long-wave IR (LWIR), and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In one aspect, the sensing component 135 may include a temperature sensor for measuring a temperature of the readout circuit 170 and/or other component(s) of the imaging system 100. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
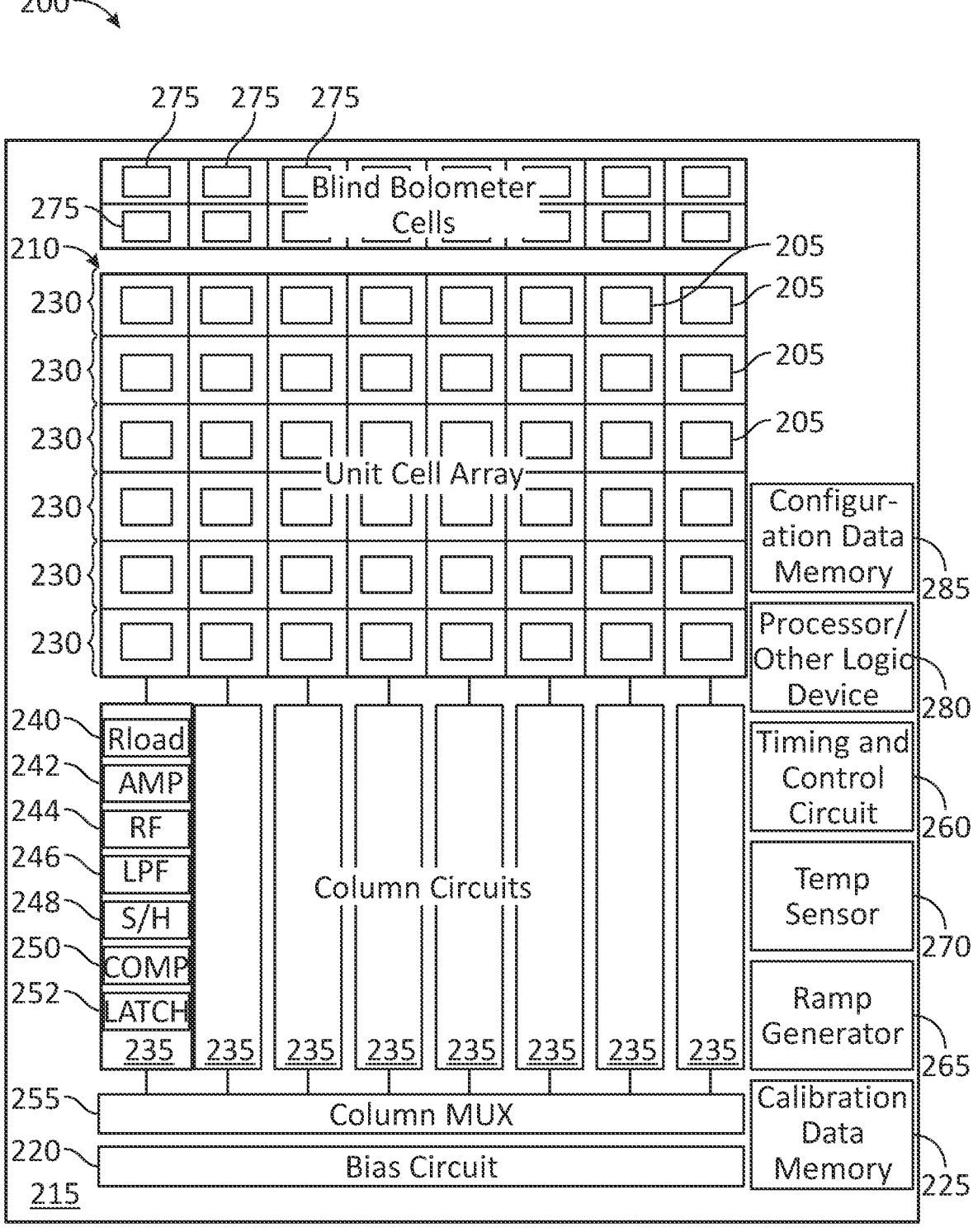
FIG. 2 illustrates an example bolometer circuit according to one or more embodiments of the present disclosure.

FIG. 2 illustrates an example bolometer circuit 200 according to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the bolometer circuit 200 may be, may include, or may be a part of, an FPA, for example, implemented as the imaging capture component 115, the processing component 105, the sensing component 135, and/or other component(s) of FIG. 1. In an embodiment, the bolometer circuit 200 may be a part of a camera, such as a thermal infrared camera.

The bolometer circuit 200 includes a plurality of active bolometers 205, which may be configured as an array arranged in a rectangle, square, circle, line, or other shape. In some non-limiting examples, the active bolometers 205 may be provided as a rectangular array having a dimension of 80×60 (e.g., 80 rows and 60 columns of unit cells), 160×120, 320×240, 512×512, 1024×1024, 2048×2048, 4096×4096, 8192×8192, or any other dimension desired for a particular application. The bolometer circuit 200 may include various components and circuits, which may be collectively referred to as a ROIC, that interface with the active bolometers 205 to generate an output. Bolometer circuits, such as some embodiments of the bolometer circuit 200, that have an array of active bolometers and associated circuits formed together on a substrate may also be referred to as FPAs.

Some portions (e.g., switches for a particular bolometer) of the ROIC may be associated with and placed in proximity to each particular one of the active bolometers 205. Each one of the active bolometers 205 together with its associated portion of the ROIC may also be referred to as a unit cell. Since the active bolometers 205 may be configured as an array, corresponding unit cells may form a unit cell array 210. Also, in the context of imaging, each one of the active bolometers 205 may also be referred to as a pixel. In some embodiments, components of the bolometer circuit 200 may be implemented on one wafer in which a bolometer array sits on (e.g., is grown on) a substrate that has an ROIC circuitry. In other embodiments, components of the bolometer circuit 200 may be implemented as a hybrid wafer arrangement such that the unit cell array 210 is hybridized to (e.g., bonded to, joined to, mated to) the ROIC circuitry. An example of such a hybridization is described with respect to FIG. 3.

The active bolometers 205 may be provided on a substrate 215, but substantially thermally isolated from the substrate 215 (e.g., released from the substrate 215 such that the active bolometers 205 are not substantially affected thermally by the substrate 215). The active bolometers 205 may be configured to receive IR radiation from an external scene, for example, directed onto the active bolometers 205 by an optical element such as an IR-transmissive lens. The IR radiation incident on the active bolometers 205 changes the temperature, and therefore the resistivity, of the active bolometers 205. The temperature and the resistivity of the active bolometers 205 may also track the temperature of the substrate 215, but because the active bolometers 205 are thermally isolated from the substrate 215, the rate of temperature change due to the substrate 215 is slower than that due to the incident IR radiation. The ROIC of the bolometer circuit 200 includes various components and circuits configured to generate an output based on the resistivity changes of the active bolometers 205 due to the incident IR radiation.

The bolometer circuit 200 includes a bias circuit 220 configured to control a bias signal (e.g., a bias voltage or current) across the active bolometers 205 in generating such an output. In general, a bias may be applied across a bolometer so that the resistance (or any change thereof) of the bolometer can be measured. According to various embodiments of the bolometer circuit 200, the bias circuit 220 may be utilized to control the bias applied across the active bolometers 205 to an appropriate level, so that the nominal values of active bolometer measurements may be adjusted to fall within a desired range. In this regard, according to some embodiments, the bias circuit 220 may be configured to set the bias based on calibration data (e.g., adjustment values stored as binary bits) stored in a calibration data memory 225. In other embodiments, such calibration data may be provided from a source external to the bolometer circuit 200 (e.g., from an external processor and/or memory), directly to the bias circuit 220 or via the calibration data memory 225. In an embodiment, the bias applied across a bolometer may be based at least in part on the bias-setting reference signal $V_{REF}$. In some aspects, the bias-setting reference signal $V_{REF}$ may be used to facilitate vacuum health detection for the bolometer circuit 200.

In some embodiments, the bias circuit 220 may be configured to set the bias globally for all of the active bolometers 205. In other embodiments, the bias circuit 220 may be configured to provide a particular bias level to each individual one or group of the active bolometers 205. In yet other embodiments, the bias circuit 220 may be configured to set a global bias level for all of the active bolometers 205 and to apply an adjustment particular to each one or group of the active bolometers 205.

Each unit cell of the unit cell array 210 may receive a bias signal (e.g., bias voltage, bias current) to bias the detector of the unit cell to compensate for different response characteristics of the unit cell attributable to, for example, variations in temperature, manufacturing variances, and/or other factors. For example, the bias circuit 220 may generate the bias signals and provide them to the unit cells. By providing appropriate bias signals to each unit cell, the unit cell array 210 may be effectively calibrated to provide accurate image data in response to light (e.g., IR light) incident on the detectors of the unit cells.

The bolometer circuit 200 includes the active bolometers 205 in an array or other arrangement. According to one or more embodiments of the bolometer circuit 200, a reduction of circuitry and interconnection may be achieved by appropriate multiplexing of the active bolometers 205 to various components of the ROIC. For example, in one embodiment, rather than replicating similar circuitry for every row 230 of the unit cell array 210, the rows 230 may be multiplexed to column circuits 235 including common components 240 through 252 that may be utilized for all of the rows 230 in a time-multiplexed manner. The column circuits 235 may generally represent any column processing circuitry as appropriate for a given application (analog and/or digital), such as amplifying and filtering signals. Signals received by the column circuits 235, such as analog signals on an analog bus and/or digital signals on a digital bus, may be processed according to the analog or digital nature of the signal. By way of non-limiting examples, in FIG. 2, components of the column circuits 235 may include a load bolometer 240, an amplifier 242, a feedback resistor 244, a low pass filter (LPF) 246, a sample-and-hold circuit 248, a comparator 250, a latch 252, and/or other components, according to one or more embodiments.

In the example shown in FIG. 2, each column of the unit cell array 210 has a corresponding one of the column circuits 235, such that all rows of unit cells in a single column may be multiplexed to a single corresponding column circuit. The column circuits 235 may in turn be multiplexed by a column multiplexer 255, for example, to generate a combined output for the unit cell array 210 in a multiplexed manner. It is noted that column circuits may be provided in numbers greater or fewer than the number of columns in the unit cell array 210. It is also noted that the unit cell array 210 may include appropriate ROIC components to generate an output without multiplexing. It should be noted that the terms "column" and "row" herein are used as mere labels to facilitate illustration, and thus may be used interchangeably depending on structures being described.

In one or more embodiments, the bolometer circuit 200 includes a timing and control circuit 260 configured to generate control signals for multiplexing the active bolometers 230 and the column circuits 235. For example, the timing and control circuit 260 may be configured to control switches associated with the active bolometers 205 and the column circuits 235 to selectively connect the active bolometers 205 to appropriate column circuits 235 according to specified timing to enable timed-multiplexing of the active bolometers 205 to the column circuits 235. In this regard, the timing and control circuit 260 may generate control signals for addressing the unit cell array 210 (e.g., to turn on or turn off switches) to allow access to and readout of image data from an addressed portion of the unit cell array 210. For explanatory purposes, the unit cell array 210 may be addressed to access and read out image data from the unit cell array 210 row by row, although in other implementations the unit cell array 210 may be addressed column by column or via other manners. In some embodiments, the timing and control circuit 260 may be further configured to provide timed control of other components of the bolometer circuit 100. For example, portions of the bias circuit 220, blind bolometer cells, or other components may be selectively enabled and/or connected in conjunction with the multiplexing of the active bolometers 205, by way of control signals generated by the timing and control circuit 260 according to appropriate timing. In another example, the calibration data (e.g., adjustment bits stored in the calibration data memory 225) or other data may be provided (e.g., transmitted, transferred, and/or latched) to appropriate components (e.g., the bias circuit 220) of the bolometer circuit 200 according to specified timing in response to control signals from the timing and control circuit 260.

The bolometer circuit 200 include blind bolometers 275. The blind bolometers 275 are thermally isolated (e.g., released) from the substrate 215, similar to the active bolometers 205. However, unlike the active bolometers 205, the blind bolometers 275 are shielded from IR radiation from an external scene. For example, one or more structures (e.g., lids, shutters, covers) may block the blind bolometers 275 from the scene that is incident on the unit cell array 210. The structure(s) may be positioned over the blind bolometers 275 (e.g., fabricated on top of the blind bolometer 275) to block (e.g., blind) the scene from the blind bolometers 275. A signal output of the blind bolometers 275 is based on ambient temperature and can be considered as being independent of the scene. The blind bolometers 275 may capture a value (e.g., an absolute value) of a temperature pedestal that is incident on the active bolometers 205 and the blind bolometers 275.

As such, the blind bolometers 275 do not substantially change temperature in response to the incident radiation level from an external scene, but do change temperature as a result of self-heating (e.g., pulse bias heating) and temperature changes in the substrate 215. In some cases, because the active bolometers 205 and the blind bolometers 275 to a first order track temperature changes due to self-heating and substrate temperature changes, the blind bolometers 275 may be configured as references for adjusting biases for the active bolometers 205. Each one of the blind bolometers 275 together with its associated circuitry (e.g., associated switches and structure or portion thereof) may be referred to as a blind bolometer cell, reference bolometer cell, blind unit cell, or reference unit cell.

For example, the unit cell array 230 may include 2048× 2048 active unit cells, with 2048×20 reference unit cells positioned in proximity to the FPA. The reference unit cells may be between, around, along the side, or generally positioned relative to the active unit cells such that an ambient temperature experienced by the reference unit cells is equal or substantially equal to an ambient temperature experienced by the active unit cells. In some cases, the reference unit cells may be in the same rows and/or columns as the active unit cells. In some cases, the reference unit cells may be additional rows adjacent to the active unit cells, as shown in FIG. 2. In some cases, the reference unit cells may be additional columns adjacent to the active unit cells. In some cases, at least one of the reference unit cells may not share a row and/or a column with any active unit cells. In various embodiments, addressing of the unit cell array 210 is generally not dependent on whether an addressed line includes only active unit cells, only reference unit cells, or both active unit cells and reference unit cells.

The bolometer circuit 200 according to some embodiments includes a ramp generator 265. The ramp generator 265 may be configured to generate a ramp signal for performing a ramp-compare analog-to-digital (A/D) conversion or for other use (e.g., as a reference signal in detecting a clock rate) in the bolometer circuit 200. In other embodiments of the bolometer circuit 200, for example in embodiments that do not include A/D conversion circuitry, the ramp generator 265 may be omitted from the bolometer circuit

200. For example, A/D conversion circuitry and a ramp generator may be external to the bolometer circuit 200 according to some embodiments.

The bolometer circuit 200 according to some embodiments includes a temperature sensor 270 configured to detect an ambient temperature associated with the substrate 215 of the bolometer circuit 200. In some embodiments, the temperature sensor 270 may be disposed on the substrate 215 in close proximity to the active bolometers 205 and/or the blind bolometers 275, so that the temperature reading obtained by the temperature sensor 270 may closely track the substrate temperature effecting these components. In some embodiments, the bolometer circuit 200 may be configured to output a substrate temperature reading based on the temperature detected by the temperature sensor 270, so that the substrate temperature reading may be accessed by components external to the bolometer circuit 200 (e.g., by a processor external to the bolometer circuit 200). For example, such a substrate temperature reading may be utilized to perform various correction (e.g., non-uniformity correction) and calibration processes by a processor or other logic device.

Temperature readings (e.g., substrate temperature readings) obtained via the temperature sensor 270 may, for example, be used to obtain and apply calibration data over a range of temperatures (e.g., substrate temperatures). In some cases, the calibration data may include data for facilitating vacuum health detection (e.g., vacuum loss detection), such as values associated with reference signals for various temperatures within an operating temperature range of the bolometer circuit 200. For a given temperature (e.g., provided by the temperature sensor 270), deviations of values associated with reference signals from the expected values at the given temperature determined during calibration (e.g., at the factory) and stored as the calibration data (e.g., in the calibration data memory 225) may indicate a possible loss of vacuum.

In some embodiments, the bolometer circuit 200 includes a processor or other logic device 280 configured to perform various operations associated with the bolometer circuit 200, based on configuration data stored in a configuration data memory 225. For example, in one embodiment, the processor or other logic device 280 may be configured to perform at least part of the various processes discussed herein. For example, for a given temperature (e.g., measured by the temperature sensor 270), the processor or other logic device 280 may determine vacuum health based on values associated with reference signals (e.g., digital count values representing values associated with reference signals) and expected values associated with such signals. In other embodiments, other external components (e.g., a processor of a host device) or internal components (e.g., the timing and control circuit 260) may additionally or alternatively be configured to perform at least part of the various processes disclosed herein below.

According to one or more embodiments, the processor or other logic device 280 may be implemented with any appropriate combination of processing devices, such as a general-purpose CPU, a PLD including an FPGA, a hard-wired ASIC, a DSP, an image signal processor (ISP), or other logic device that may perform processing operations by executing instructions provided from the configuration data memory 285 and/or by configuring logic circuits according to configuration data (e.g., FPGA configuration data) provided from the configuration data memory 285. In an aspect, an output signal provided by the unit cell array 230 and read out by the ROIC may be an image formed of the pixel values from the unit cells of the unit cell array 230. The processor or other logic device 280 may perform operations such as NUC, spatial and/or temporal filtering, and/or other operations. The images (e.g., processed images) may be stored in memory (e.g., external to or local to the imaging system) and/or displayed on a display device (e.g., external to and/or integrated with the imaging system).

As discussed, FIG. 2 is a block diagram to facilitate description and explanation of the bolometer circuit 200 and its various components for one or more embodiments of the present disclosure. As such, the block diagram of FIG. 2 is not intended to limit the size, the number, the placement, or the orientation of the various components illustrated therein. For example, although blind bolometers are represented by rows of blind bolometers 275 above the unit cell array 210 in FIG. 2, some or all of the blind bolometers represented by the blind bolometers 275 may be provided as one or more columns of blind bolometers (e.g., to implement blind bolometers for bias columns) adjacent to columns of the unit cell array 210 as desired for particular implementations of the bolometer circuit 200 according to various embodiments.

In an embodiment, the bolometer circuit 200 may be implemented as part of an imaging system (e.g., 100). In addition to the various components of the bolometer circuit 200, the imaging system may also include one or more processors, memories, logic, displays, interfaces, optics (e.g., lenses, mirrors, beamsplitters), and/or other components as may be appropriate in various implementations. It is noted that the various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

Figure 3:
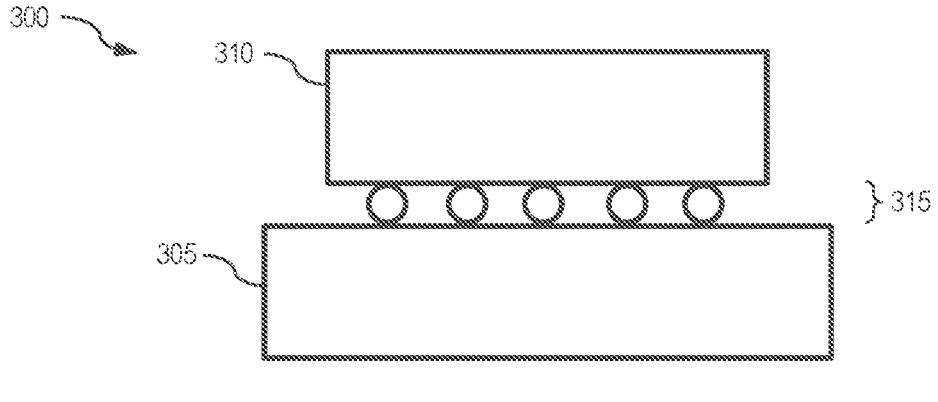
FIG. 3 illustrates an example bolometer circuit in accordance with one or more embodiments of the present disclosure.

The bolometer circuit 200 may be implemented using a single wafer in which a bolometer array may sit on (e.g., be grown on) an ROIC in various embodiments, or a hybrid or other circuitry on a second wafer in other embodiments. In one example embodiment that uses multiple wafers, components of the bolometer circuit 200 may be implemented such that a detector array is hybridized to (e.g., bonded to) a readout circuit. For example, FIG. 3 illustrates an example bolometer circuit 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the bolometer circuit 300 may be, may include, or may be a part of the bolometer circuit 200.

The bolometer circuit 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 210). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

In various aspects, an FPA formed of a detector array (e.g., active bolometer array), blind bolometer array, and an ROIC may be situated within a vacuum package to provide a high vacuum environment that facilitates achieving of a desired sensitivity from the detector array. Vacuum integrity may degrade over time due to various factors, such as outgassing and/or leaks. For instance, when vacuum is lost, air and/or other gases may enter the sensor cavity and adversely affect the detector's thermal isolation. Such degradation in vacuum integrity may result in a gradual loss of vacuum pressure and consequently a reduction in sensitivity and overall performance of the FPA. The reference detectors of the FPA are shielded from incident or external radiation and, similar to the active detectors, are substantially thermally isolated from the ROIC substrate. The active detectors and reference detectors may share various properties, such as operating within the same vacuum cavity and sharing noise properties (e.g., temporal noise properties).

In one or more embodiments, an imaging system includes active cells of a detector array and blind cells operating within the same vacuum cavity. For explanatory purposes, the active cells include active bolometers and blind cells include blind bolometers, although other appropriate types of IR detectors may be used. A reference signal $V_{REF}$ generated by blind bolometers may be used to facilitate vacuum health detection of the detector array (e.g., the unit cell array 210 of FIG. 2). In an aspect, the reference signal $V_{REF}$ may be referred to as a bias-setting reference signal or a bias column signal (e.g., when the detector array is addressed row by row). The blind cells may be part of a bias circuit (e.g., the bias circuit 220 of FIG. 2). The reference signal $V_{REF}$ may be used to compensate for self-heating (e.g., pulse bias heating) of active bolometers. In an aspect, the reference signal $V_{REF}$ may be referred to as an anti-ramp voltage.

Using various embodiment, a quality of the vacuum may be determined by saving/storing a value of the reference signal $V_{REF}$ every line. For example, when the detector array is read out row by row, a line may refer to a row. In some cases, a value of the reference signal $V_{REF}$ is saved at an end of the line (e.g., when all other samples from active detectors of the line are taken/readout). The reference signal $V_{REF}$ generally has a maximum change on it at the end of the line, since the bolometer has been on for the entire line time. A line time (e.g., also referred to as line addressing time period) may refer to a time period associated with addressing a line (e.g., a row or a column depending on implementation) of the unit cell array 210. When the unit cell array 210 is read out row by row, the line time may be referred to as a row time.

In some cases, the reference signal $V_{REF}$ may be buffered and provided to active pixels of the detector array. For example, the reference signal $V_{REF}$ may be provided to all columns of the detector array. The reference signal $V_{REF}$ may have a different slope over temperature (e.g., ambient temperature). In an aspect, hotter temperatures are associated with higher pulse-biased heating and thus larger slope. When a vacuum that an FPA and bolometers are in is of high quality, the reference signal $V_{REF}$ has a larger slope as the pulse-bias heating is not degraded by a thermal shunt to air. As the vacuum degrades, the slope of the reference signal $V_{REF}$ buffered to the detector array flattens. In this regard, as the vacuum degrades, the pixels may become thermally shunted to the temperature of the air around the pixels, thus causing a degradation in the response of the pixels to the scene.

During calibration (e.g., in the factory), since an end value of the reference signal $V_{REF}$ changes not only vacuum but also with temperature, the value of the reference signal $V_{REF}$ for temperatures within an operating temperature range of the bolometers in the case of a high quality vacuum may be determined and saved. Such values of the reference signals $V_{REF}$ may be referred to as expected reference signal values or calibrated reference signal values. For example, a lookup table, an equation, and/or other data structure/relation may be used to store and/or compute values of the reference signal $V_{REF}$ for temperatures within the operating temperature range (e.g., such as in the calibration data memory 225).

In the field, for blind bolometers at a given temperature (e.g., ambient temperature measured by the temperature sensor 270), if a value of the reference signal $V_{REF}$ generated by the blind bolometers deviates beyond a threshold amount from the expected reference signal value at that temperature, a vacuum that the blind bolometers, and active bolometers of the detector array, are in may be determined to have degraded significantly. The threshold amount may be selected based on application (e.g., requirements associated with image data integrity), cost considerations, and so forth. The threshold amount may be characterized by a vacuum level (e.g., amount of vacuum loss), thermal transconductance, and/or other characteristic(s) associated with a vacuum of the bolometer circuit 200. In some aspects, a change (e.g., loss) of vacuum may be associated with a change (e.g., increase) in thermal transconductance. As one example, the threshold amount may be associated with a 10% loss of vacuum. In some cases, when such a deviation is detected, imaging system electronics may raise a flag to warn the imaging system and/or the user that the detector array may have degraded performance (e.g., image data generated by the detector array may be degraded) due to a loss/degradation of vacuum. As non-limiting examples, mitigation actions may include adjust processing performed by the imaging system (e.g., by the processor or other logic device 280 of the imaging system) due to the loss of vacuum, resetting the imaging system (or portion thereof) to determine if the error is a transient fault, cycling power associated with the imaging system (or portion thereof) to determine if the error is a transient fault, or replace the imaging system (e.g., replace a camera containing the imaging system with a different camera).

If the value of the reference signal $V_{REF}$ generated by the blind bolometers has a deviation within the threshold amount from the expected reference signal value at the temperature, the vacuum may be determined to have not degraded significantly (e.g., not have degraded to an extent that needs user or imaging system attention), although the deviation may be stored and/or reported (e.g., to the imaging system electronics and/or user) for monitoring.

Figure 4:
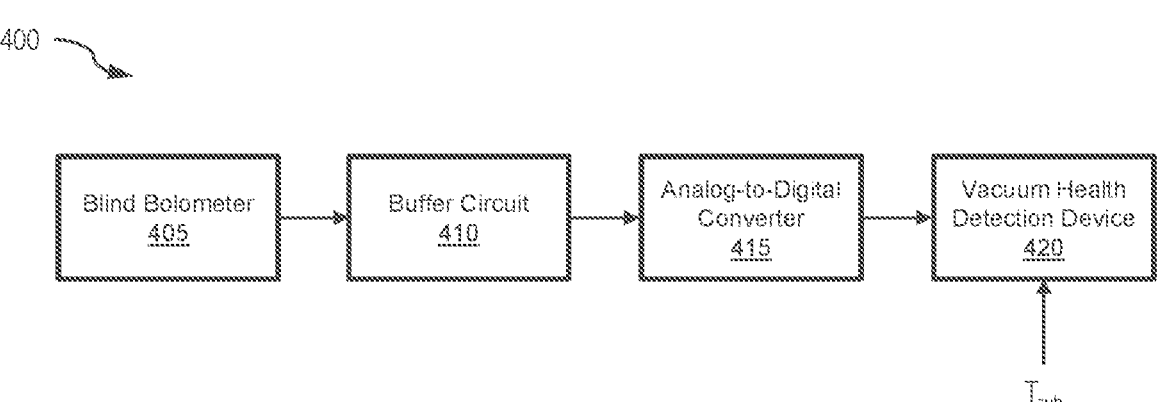
FIG. 4 illustrates an example system for facilitating vacuum health detection in accordance with one or more embodiments of the present disclosure.

FIG. 4 illustrates an example system 400 for facilitating vacuum health detection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 includes a blind bolometer 405, a buffer circuit 410, an A/D converter 415, and a vacuum health detection device 420. The blind bolometer 405 generates a reference signal $V_{REF}$. The buffer circuit 410 (e.g., sample-and-hold circuit) stores (e.g., temporarily stores, buffers, holds, saves) the reference signal $V_{REF}$. In one case, the buffer circuit 110 samples and buffers the value of the $V_{REF}$ every line. For example, the value of the reference signal $V_{REF}$ may be sampled near an end of a line time. In an aspect, the buffer circuit 410 may include one or more buffer amplifiers, one or more multiplexers, and/or one or more sample-and-hold circuits. The buffer amplifier(s), multiplexer(s), and/or sample-and-hold circuit(s) may be appropriately arranged to facilitate timing associated with readout of the value of the reference signal $V_{REF}$ relative to readout of the active bolometers. The multiplexer(s) may be optional. In some cases, the buffer circuit 410 does not change the reference signal $V_{REF}$ generated by the blind bolometer 405. In other cases, the buffer circuit 410 may process (e.g., level shift and/or other processing) to adjust a value of the reference signal $V_{REF}$.

The A/D converter 415 receives the value of the reference signal $V_{REF}$ from the buffer circuit 410 and generates a digital count value indicative of the value. For example, the A/D converter 415 may include a ramp generator that generates a ramp signal and a comparator that receives and compares the ramp signal from the ramp generator with the reference signal $V_{REF}$ from the buffer circuit 410 to provide the digital count value as a digital representation of the value of the reference signal $V_{REF}$.

The vacuum health detection device 420 receives the digital count value from the A/D converter 415 and a temperature $T_{sub}$ associated with the blind bolometer 405 (e.g., measured by a temperature sensor of or coupled to the system 400). In an aspect, the temperature $T_{sub}$ may be a temperature of an ROIC (e.g., also referred to as an ambient temperature or substrate temperature) associated with the system 400. The vacuum health detection device 420 determines vacuum health based on the digital count value and an expected digital count value for the temperature $T_{sub}$. For example, the vacuum health detection device 420 may determine (e.g., compute) a deviation between the digital count value and an expected digital count value to determine whether a loss of vacuum associated with the blind bolometer 405 is above a threshold amount (e.g., 10% loss of vacuum). In some cases, the vacuum health detection device 420 may output an indication of the vacuum health. As one example, the vacuum health detection device 420 may provide the indication only when a possible error state (e.g., vacuum loss beyond a threshold) is detected. As another example, the vacuum health detection device 420 may provide the indication when a possible error state is detected as well as when no error state is detected. In some embodiments, the A/D converter 415 is optional, such that the value of the reference signal $V_{REF}$ is an analog signal that is directly used by the vacuum health detection device 420 for comparison with an expected value to determine vacuum health.

Figure 5:
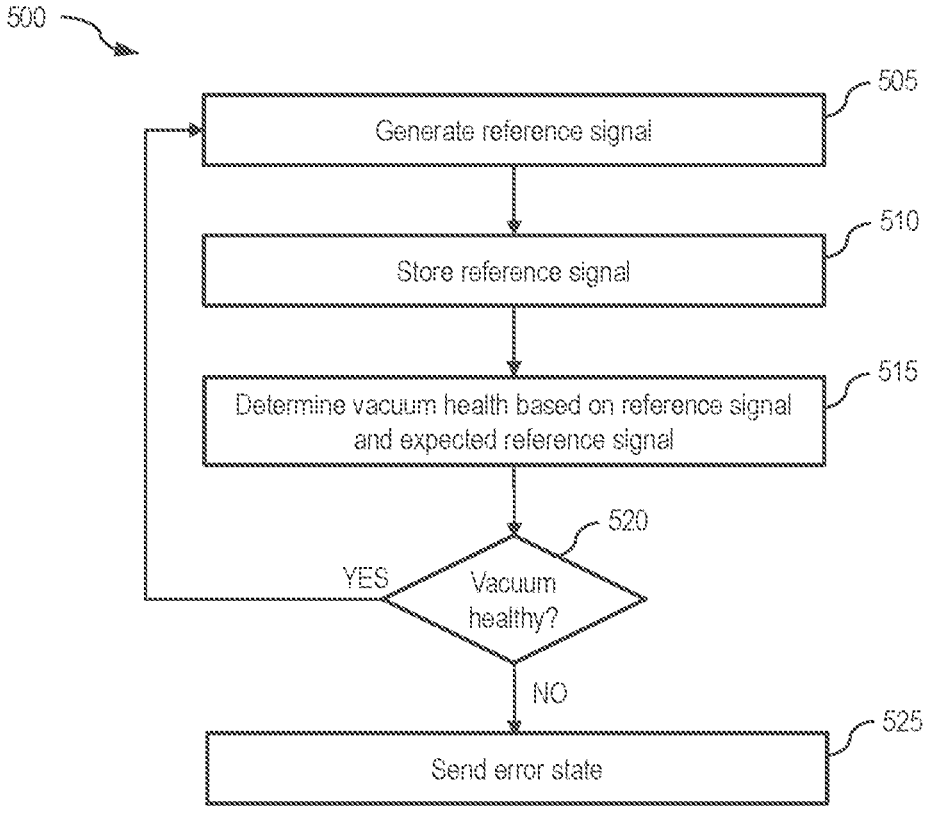
FIG. 5 illustrates a flow diagram of an example process for facilitating vacuum health detection in accordance with one or more embodiments of the present disclosure.

FIG. 5 illustrates a flow diagram of an example process 500 facilitating vacuum health detection (e.g., vacuum loss detection) in accordance with one or more embodiments of the present disclosure. For explanatory purposes, the process 500 is primarily described herein with reference to the system 400 of FIG. 4. However, the process 500 can be performed in relation to other systems for facilitating vacuum health detection. Note that one or more operations in FIG. 5 may be combined, omitted, and/or performed in a different order as desired.

At block 505, the blind bolometer 405 generates a reference signal $V_{REF}$. At block 510, the buffer circuit 410 stores (e.g., buffers, holds, saves) the reference signal $V_{REF}$. In this regard, the buffer circuit 410 may sample the reference signal $V_{REF}$ to obtain a sampled value of the reference signal $V_{REF}$. In one aspect, the buffer circuit 410 may sample the reference signal $V_{REF}$ at around an end of a line time. An end of a line time may be a latter half of a line time, a last 30% of a line time, a last 20% of a line time, a last 10% of a line time, a last 5% of a line time, a last 2% of a line time, a last 1% of a line time, any time in between, or less than a last 1% of a line time. In some cases, the buffer circuit 410 does not change the reference signal $V_{REF}$ generated by the blind bolometer 405. In other cases, the buffer circuit 410 may process (e.g., level shift and/or other processing) to adjust a value of the reference signal $V_{REF}$. At block 515, the vacuum health detection device 420 determines vacuum health based on the reference signal $V_{REF}$ and an expected reference signal. In an aspect, a temperature associated with the blind bolometer 405 may be determined (e.g., by the temperature sensor 270) and an expected reference signal associated with the temperature may be used by the vacuum health detection device 420. The vacuum health detection device 420 may determine the vacuum health by determining a difference between the reference signal $V_{REF}$ and the expected reference signal. In some cases, an A/D converter may convert the buffered reference signal to a digital count value, and the vacuum health detection device 420 may 5 determine a difference between the digital count value and an expected digital count value.

At block 520, the vacuum health detection device 420 determines whether the vacuum can be considered healthy. In some cases, the vacuum health detection device 420 may determine whether the vacuum can be considered healthy by comparing the difference between the reference signal $V_{REF}$ and the expected reference signal with a threshold. For example, the difference exceeding the threshold may represent a more than 10% loss of vacuum. The vacuum can be considered to not be healthy if the difference is above the threshold (e.g., the difference represents a 10% or more loss of vacuum). If the determination at block 520 is that the vacuum can be considered healthy, the process 500 proceeds to block 505 to cause generation of the reference signal (e.g., for a next line of the unit cell array 210).

If the determination at block 520 is that the vacuum is not considered healthy, the process 500 proceeds to block 525. At block 525, the vacuum health detection device 420 sends an error state (e.g., to facilitate mitigation action and/or further analysis by a user and/or an imaging system that includes the blind bolometer 405). In some cases, even when a potential loss of vacuum is detected and the error state is sent (e.g., at block 525), the imaging system may continue to operate to capture image data and the process 500 and may proceed back to block 505 to generate a reference signal (e.g., for a next frame or for a next line of a frame).

Although FIG. 5 illustrates an example in which a single threshold is used, in some embodiments, multiple thresholds can be used. For example, when the difference between the reference signal $V_{REF}$ and the expected reference signal represents less than 10% loss of vacuum, no error state is sent. When the difference represents between 10% and 15% loss of vacuum, an error state is sent indicating the estimated loss of vacuum for monitoring purposes, but no other actions are performed by the imaging system without user intervention. When the difference represents more than 15% loss of vacuum, an error state is sent indicating the estimated loss of vacuum and mitigation actions suggested to the user. A number of thresholds and a value associated with each threshold may be defined by the user, a manufacturer of the imaging system (e.g., based on general imaging application requirements), a deployment manager of the imaging system (e.g., as a part of a larger surveillance application), and/or others.

As non-limiting examples, mitigation actions may include adjust processing performed by the imaging system due to the loss of vacuum, resetting the imaging system (or portion thereof) to determine if the error is a transient fault, cycling power associated with the imaging system (or portion thereof) to determine if the error is a transient fault, or replace the imaging system (e.g., replace a camera containing the imaging system with a different camera). For instance, the vacuum health detection device 420 may send the error state to other components of the imaging system, such as the processor or other logic device 280. The processor or other logic device 280 may process image data captured by the active bolometers to mitigate degradation that may be associated with loss of vacuum.

Figure 6:
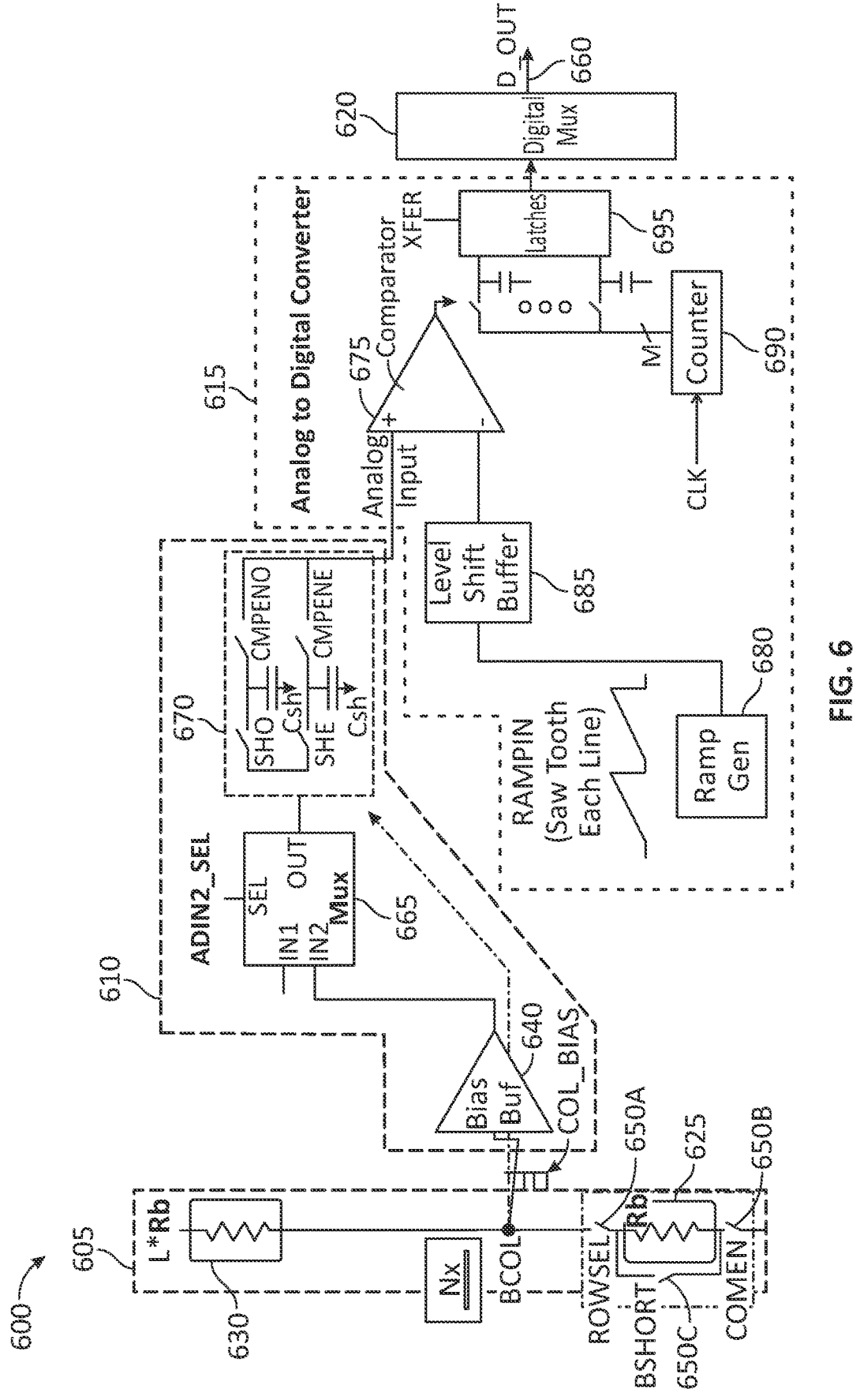
FIG. 6 illustrates an example bias circuit for facilitating vacuum detection according to one or more embodiments of the present disclosure.

FIG. 6 illustrates an example bias circuit 600 for facilitating vacuum detection (e.g., vacuum loss detection) according to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the bias circuit 220 and the column circuit 235, or portions thereof, may collectively implement the bias circuit 600 or portion thereof. The bias circuit 600 may represent an example implementation of a portion of the bolometer circuit 200.

The bias circuit 600 includes bias columns (e.g., including a bias column 605), a buffer circuit 610, an A/D converter 615, and a multiplexer 620. In FIG. 6, the bias column 605 is one of N bias columns. Other bias columns may include similar components as those shown in the bias column 605. The bias column 605 provides (e.g., at a node labeled BCOL in FIG. 6) a voltage level $V_{REF}$ that varies in response to self-heating of a blind bolometer 625 that tracks self-heating of an active bolometer (not shown in FIG. 6). The blind bolometer 625 is thermally isolated (e.g., released) from a substrate while being substantially shielded from incident IR radiation and thus a temperature of the blind bolometer 625 changes due to self-heating and substrate temperature changes but not incident IR radiation. In some cases, the blind bolometer 625 may be implemented to exhibit a similar temperature coefficient of resistance (TCR) and resistance value as the active bolometer.

The bias column 605 includes a thermally-shorted bolometer 630 may act as a temperature-compensated load. The thermally-shorted bolometer 630 may be coupled to the blind bolometer 625 in series in a conduction path. In an aspect, the conduction path extends from a supply voltage node to a common voltage node and mirrors a conduction path including a thermally-shorted bolometer and active bolometer for measuring incident IR radiation. Due to such mirroring of the active bolometer using the blind bolometer that tracks resistance changes at the active bolometer due to self-heating, the bias column 605 may act as a voltage divider that provides a varying voltage level (e.g., when taken from the node labeled BCOL) indicative of at what level the bias-setting reference voltage $V_{REF}$ should be in order for an output associated with the active bolometer to represent predominantly incident IR radiation from a scene given temperature variations attributable to self-heating at the active bolometer. Switches 650A-C are provided for the blind bolometer 625 and are selectively closed or opened according to appropriate timing based on signals from a timing and control circuit (e.g., the timing and control circuit 260). Each of the switches 650A-C may be appropriately closed or opened to selectively enable the blind bolometer 625 to track self-heating of the corresponding active bolometer.

The node BCOL of the bias column 605 is coupled to a buffer 640. In some cases, the buffer 640 may receive the voltage $V_{REF}$ and output the voltage $V_{REF}$. In other cases, the buffer 640 may adjust the voltage $V_{REF}$ in response bias adjustment bits and output the adjusted voltage. The bias adjustment bits may be applied to make a global fine adjustment to the varying, self-heating-compensating voltage level provided by the bias column 605. For example, the bias adjustment bits may be stored in calibration data memory. For explanatory purposes, the output of the buffer 640 is referred to as the voltage $V_{REF}$. In an aspect, by using multiple bias columns, voltage levels at corresponding BCOL nodes may be averaged to provide an averaged reference voltage $V_{REF}$ to the buffer 640. The averaged reference voltage $V_{REF}$ may be later used as a basis for detecting a loss of vacuum associated with the blind bolometer 625 and/or other blind bolometers. In an aspect, the buffer 640 may be used to drive a signal at the BCOL node to a large capacitive load since the reference signal $V_{REF}$ goes to all columns. Since the sample-and-hold circuit 670 and the A/D converter 615 is one of those columns and the reference signal $V_{REF}$ was already going to the columns, the reference signal $V_{REF}$ may be used over BCOL.

The output of the buffer 640 is provided to an IN2 input of a multiplexer 665 to allow a voltage stored on a sample-and-hold circuit 670 to be either the output of the buffer 640 or a signal provided to an IN1 input of the multiplexer 665. An output of the multiplexer 665 is connected to the sample-and-hold circuit 670. The multiplexer 665 and sample-and-hold circuit 670 may be operated to store the voltage $V_{REF}$ (e.g., as output by the buffer 640) for a duration of time controlled using signals from the timing and control circuit. Such time control may facilitate timing associated with readout of the value of the reference signal $V_{REF}$ relative to readout of the active bolometers. In one case, the output of the buffer 640 may also be provided to other circuitry (not shown in FIG. 6), such as circuitry to generate a bias signal for active bolometers.

The multiplexer 665 may allow the A/D converter 615 to be shared (e.g., time multiplexed) with other circuitry. As an example, in a first mode, the multiplexer 665 may be used to route the output of the buffer 640 received via its IN2 input to the sample-and-hold circuit 670 to facilitate vacuum health determination/detection. In a second mode, the multiplexer 665 may be used to route a signal received via its IN1 input from other circuitry (not shown in FIG. 6) to the sample-and-hold circuit 670 (e.g., for other purposes). In some aspects, such as when the A/D converter 615 is dedicated for facilitating vacuum health determination/detection, the multiplexer 665 is optional. In some aspects, more than one multiplexer may be used (e.g., to selectively provide one of a plurality of signals to the sample-and-hold circuit 670). In some cases, multiplexers may be used such that various components may be shared by a fewer number of A/D converters (e.g., compared to a case in which an imaging system is implemented with fewer multiplexers and more A/D converters). In some aspects, the buffer 640 and/or multiplexer 665 may be optional. In some cases, the reference signal $V_{REF}$ is provided from the BCOL node directly to the sample-and-hold circuit 670 (e.g., without an intervening buffer amplifier or multiplexer).

A value of the voltage $V_{REF}$ held by the sample-and-hold circuit 670 is provided to an input of a comparator 675 of the A/D converter 615. A ramp generator 680 of the A/D converter 615 generates a ramp signal (e.g., ramp voltage). The ramp signal may be a linearly rising signal or a linearly falling signal with respect to time. In some cases, the ramp signal may be a sawtoothed signal that starts at a minimum at around a start of a line time and ends at a maximum at around an end of a line time. A level shift buffer 685 may be optional and may be used to level shift the ramp signal. In some cases, the ramp generator 680 and the level shift buffer 685 may be collectively referred to as a ramp generator. An output of the level shift buffer 685 is provided to an input of the comparator 675.

In some aspects, as shown in FIG. 6, the sample-and-hold circuit 670 may be implemented as two sample-and-hold components that each include two switches and a shunt capacitor. A first sample-and-hold component includes switches SHO and CMPENO and a shunt capacitor Csh. A second sample-and-hold component includes switches SHE and CMPENE and a shunt capacitor Csh. In one example, consider a unit cell array having at least rows 1 through 3, with the unit cell array being read row by row starting with row 1. During a first line time, a value of the reference voltage $V_{REF}$ associated with row 1 may be driven into the first sample-and-hold component. During a second line time, a value of the voltage reference $V_{REF}$ associated with row 2 may be driven into the second sample-and-hold component. As the $V_{REF}$ value associated with row 2 is driven into the second sample-and-hold component, the $V_{REF}$ value associated with row 1 may be provided from the first sample-and-hold component to the A/D converter 615. During a third line time, a value of the voltage reference $V_{REF}$ associated with row 3 may be driven into the first sample-and-hold component. As the $V_{REF}$ value associated with row 3 is driven into the first sample-and-hold component, the $V_{REF}$ value associated with row 2 may be provided from the second sample-and-hold component to the A/D converter 615. It is noted that the sample-and-hold circuit 670 may be implemented differently from that shown in FIG. 6. As one example, in other aspects, a sample-and-hold circuit may be implemented with a pair of switches and one shunt capacitor. As another example, a sample-and-hold circuit may be implemented with more than two pairs of switches and more than two shunt capacitors.

The comparator 675 generates an output indicative of whether the value of the voltage $V_{REF}$ provided by the sample-and-hold circuit 670 is nominally equal to (e.g., substantially equal to, slightly above) the output of the level shift buffer 685. The comparator 675 may be referred to as triggered when the value of the voltage $V_{REF}$ provided by the sample-and-hold circuit 670 is nominally equal to the output of the level shift buffer 685. The output of the comparator 670 is an intersection of the value of the voltage $V_{REF}$ and the output of the level shift buffer 685. A counter circuit 690 adjusts (e.g., increments or decrements depending on implementation) a count value (e.g., encoded in one or more count signals) in response to receiving a clock signal. The count value adjusted by the counter circuit 690 may have a substantially similar period (e.g., resets to zero or a base value at substantially the same time) as the ramp signal generated by the ramp generator 680. In FIG. 6, the count value is represented using M bits. When the comparator 675 triggers, the count value of the counter circuit 690 is selected and stored in latches 695. The latches 695 provides the latched count value to a multiplexer 620. The multiplexer 620 multiplexes digital values (e.g., digital bits) stored in the latches 695 to generate a digital output signal 660. The digital output signal 660 is a digital representation of the voltage $V_{REF}$ provided by the sample-and-hold circuit 670. The digital output signal 660 may be provided to processing circuitry downstream of the bias circuit 600, such as processing circuitry to determine vacuum health based on the digital output signal 660 and an expected digital signal.

Figure 7:
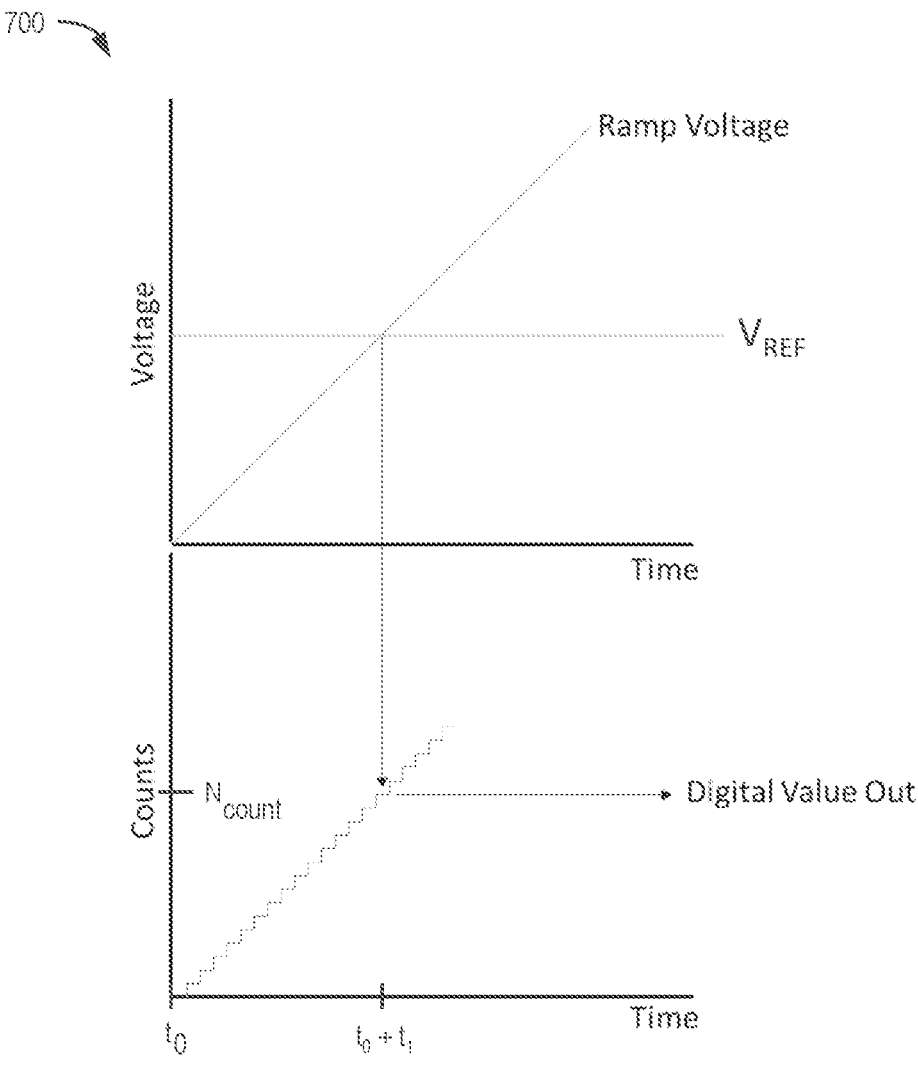
FIG. 7 illustrates a graph of a ramp voltage associated with a ramp generator and digital count values associated with a counter circuit as a function of time.

FIG. 7 illustrates a graph 700 of a ramp voltage associated with a ramp generator and digital count values associated with a counter circuit as a function of time. For example, the ramp voltage may be generated by the ramp generator 265 of FIG. 2 and/or the ramp generator 680 of FIG. 6, and/or the digital count values may be implemented by the counter circuit 690 of FIG. 6. At a time $t=t_0$, the ramp voltage and the digital count value may be at a respective level. In FIG. 7, the ramp voltage and digital count value are shown to be at zero at time $t=t_0$. In other cases, the ramp voltage and/or the digital count value may be at a respective predetermined value (e.g., predetermined non-zero value) at time $t=t_0$. The digital count value incrementally increases with time. Synchronous with the digital count value incrementally increasing, the ramp voltage begins to ramp up (e.g., linearly increase) with time.

At a time $t=t_0+t_1$, when the ramp voltage is equal to (e.g., substantially equal to, slightly above) the reference signal $V_{REF}$, a comparator (e.g., the comparator 675 of FIG. 6) transitions its comparator output voltage (e.g., from high to low or low to high dependent on implementation). The transition of the comparator output voltage causes the digital count value of the counter circuit at or around the time of the transition to be stored. In this regard, a digital count value $N_{count}$ provided by the counter circuit at or around the time the comparator output voltage transitions is stored. In an aspect, a memory element may include a latch(es) or flip-flop circuit(s) that uses the clock to capture the digital count value. For example, the latch(es) may be the latches 695 of FIG. 6.

Figure 8:
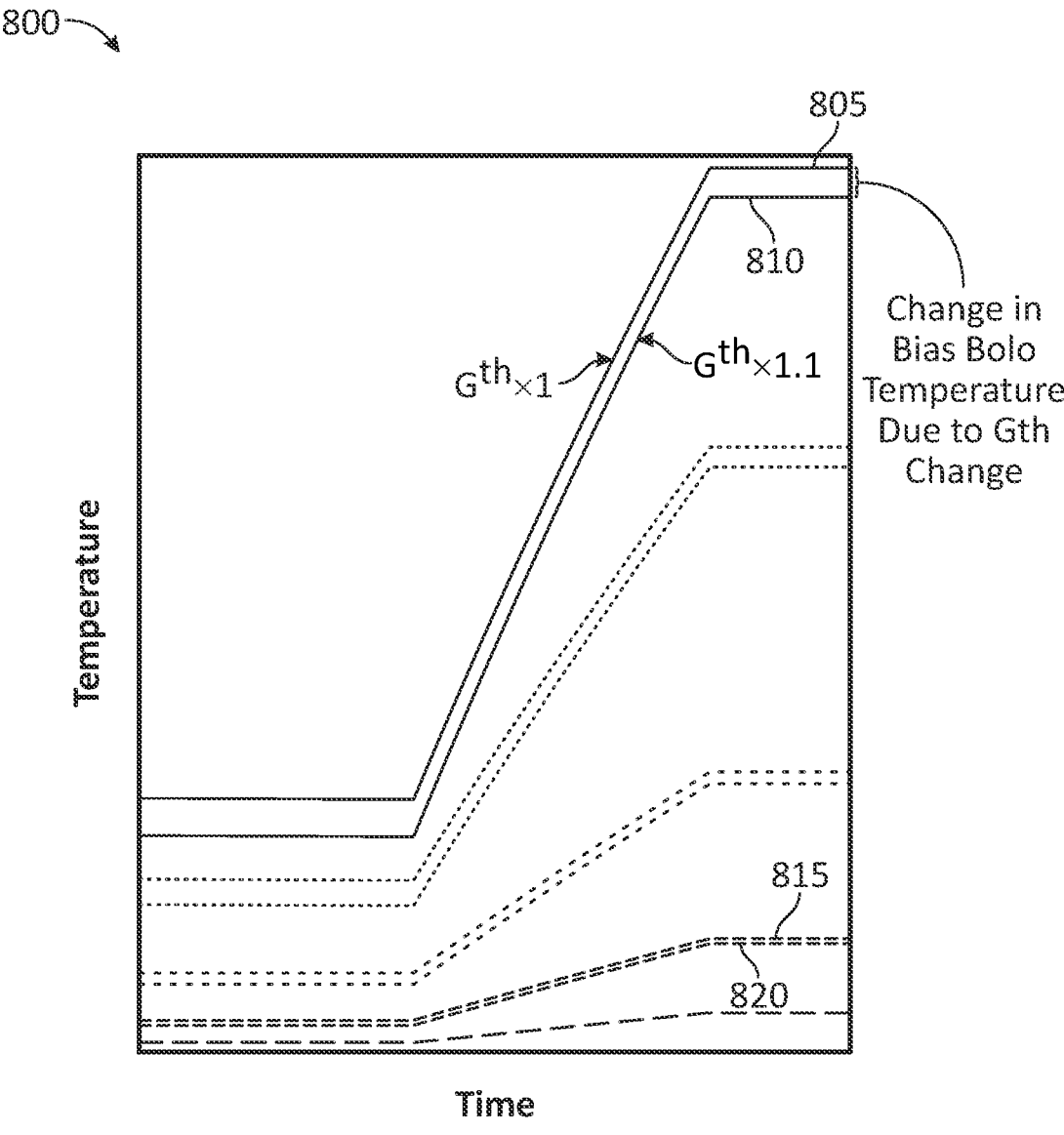
FIG. 8 illustrates a graph of a relationship between a temperature as a function of time and thermal transconductance for different ambient temperatures in accordance with one or more embodiments of the present disclosure.

FIG. 8 illustrates a graph 800 of a relationship between a temperature as a function of time and thermal transconductance for different ambient temperatures in accordance with one or more embodiments of the present disclosure. A top curve 805 is associated with a thermal transconductance $G_{th}$ and a bottom curve 810 is associated with a thermal transconductance $1.1G_{th}$ (e.g., 10% higher than the thermal transconductance associated with the top curve 805). A top curve 815 is associated with a thermal transconductance $G_{th}$ and a bottom curve 820 is associated with a thermal transconductance $1.1G_{th}$. The curves 805 and 810 may characterize a bolometer associated with a higher ambient temperature than a bolometer characterized by the curves 815 and 820. Other unlabeled curves associated with other ambient temperatures are also provided in FIG. 8. In general, a decreasing vacuum is associated with a higher thermal transconductance. In some cases, the reference voltage signal $V_{REF}$ may be measured toward an end of a line time. As shown in FIG. 8, due to differences in the thermal transconductance, a difference in temperature is present between the top curve 805 and the bottom curve 810, and between the top curve 815 and the bottom curve 820.

Figure 9:
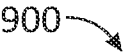
FIG. 9 illustrates a graph of a relationship between a reference voltage signal as a function of temperature and thermal transconductance in accordance with one or more embodiments of the present disclosure.
Figure 9:
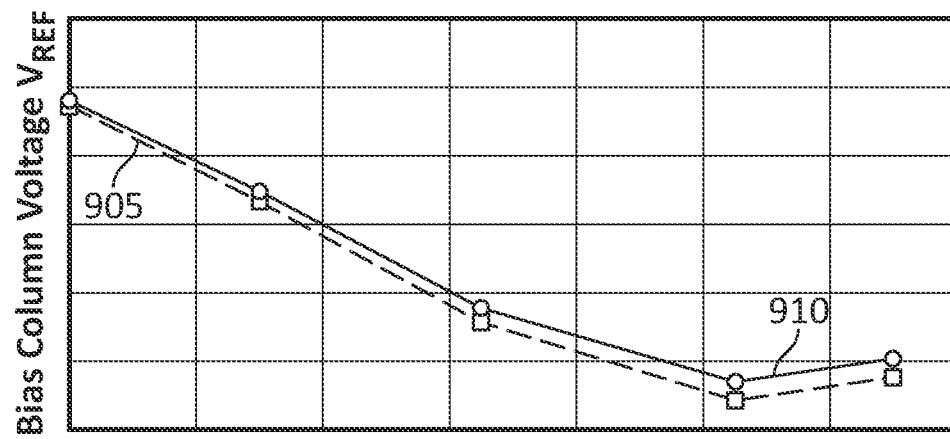
Figure 10:
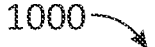
FIG. 10 illustrates a graph of a relationship between a difference in a reference voltage signal at two different thermal transconductances as a function of frame number and temperature in accordance with one or more embodiments of the present disclosure.
Figure 10:
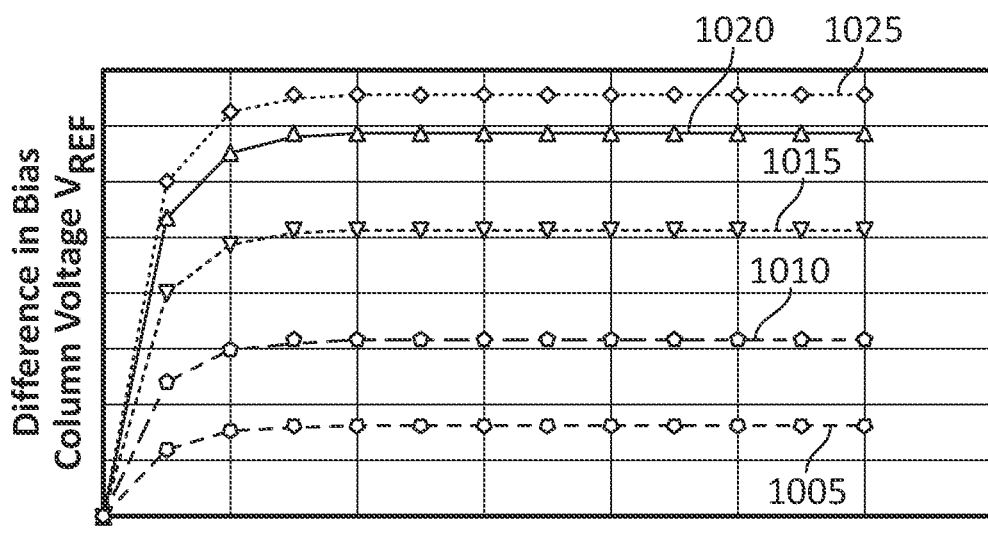

FIG. 9 illustrates a graph 900 of a relationship between a reference voltage signal as a function of temperature and thermal transconductance in accordance with one or more embodiments of the present disclosure. A bottom curve 905 and a top curve 910 represent the reference voltage signal as a function of temperature for a thermal transconductance $G_{th}$ and $1.1G_{th}$, respectively. A difference in the reference voltage signal is present between the bottom curve 905 and the top curve 910 over a range of ambient/ROIC temperatures (e.g., temperatures ranging from cold operation to warm operation). FIG. 10 illustrates a graph 1000 of a relationship between a difference in a reference voltage signal at two different thermal transconductances (e.g., $G_{th}$ and $1.1G_{th}$) as a function of frame number and temperature in accordance with one or more embodiments of the present disclosure. Curves 1005, 1010, 1015, 1020, and 1025 are associated with temperatures ranging from cold operation to warm operation, with these curves being ordered/labeled from a lowest temperature for the curve 1005 to a highest temperature for the curve 1025. After a few frame times (e.g., a few time constants), the difference between the reference voltage signal stabilizes at a voltage level.

Figure 11:
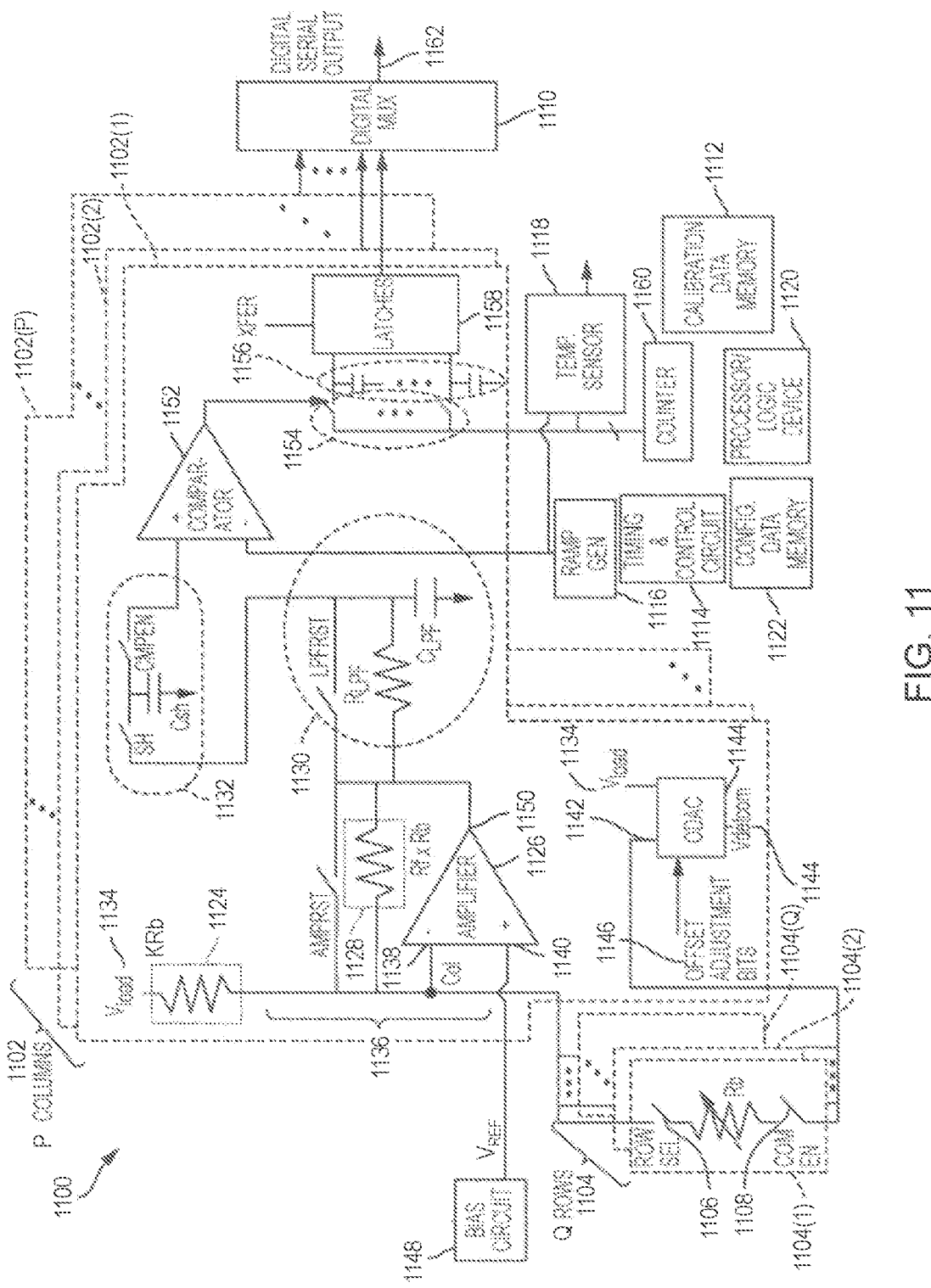
FIG. 11 illustrates an example bolometer circuit in accordance with one or more embodiments of the present disclosure.

FIG. 11 illustrates an example bolometer circuit 200 according to one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the bolometer circuit 300 may be, may include, or may be a part of, the bolometer circuit 200 of FIG. 2. In an embodiment, the bolometer circuit 1100 may be a part of a camera, such as a thermal infrared camera.

The bolometer circuit 1100 includes one or more column circuit blocks 1102 (individually identified as column circuit block 1102(1) through 1102(P), where P may represent the desired number of columns in a unit cell array (e.g., 210)). Each column circuit block 1102 may be associated with one or more active bolometers 1104. In FIG. 11, only those one or more active bolometers 1104 (individually identified as active bolometers 1106(1) through 1106(Q), where C may represent the desired number of rows in the unit cell array) that are associated with the column circuit block 1102(1) are shown for clarity, but it will be understood that other active bolometers 1104 not explicitly shown in FIG. 11 may be provided and associated with other column circuit blocks 1102(2) through 1102(P).

Each of the active bolometers 1104 may be accompanied by switches 1106 and 1108 for selectively enabling and connecting to a corresponding one of the column circuit blocks 1102. In some embodiments, one or more blind bolometers (e.g., 625 in FIG. 6) may additionally be associated with each column circuit block 1102. Such blind bolometers may be configured to be selectively enabled and connected to each column circuit block 1102 via accompanying switches, for example, to provide a reference signal level for calibration and other purposes.

In some aspects, the column circuit block 1102 may represent one of the column circuits 235, and the active bolometer 1104 may represent one of the active bolometers 205 of the kilometer circuit 200, where the active bolometer 205 may be selectively coupled to a corresponding one of the column circuits 235 via switches. In this regard, the bolometer circuit 1100 according to various embodiments may further include a column multiplexer 1110, a calibration data memory 1112, a timing and control circuit 1114, a ramp generator 1116, a temperature sensor 1118, a processor or other logic device 1120, and/or a configuration data memory 1122, all of which may be implemented in a similar manner as their corresponding components of the bolometer circuit 200. According to various embodiments, each column circuit block 1102 may include a thermally shorted bolometer 1124, an amplifier 1126 (an operational amplifier), a thermally shorted bolometer 1128 (e.g., feedback bolometer), a LPF 1130 (e.g., a RC LPF), and/or a sample-and-hold circuit 1132.

In various embodiments, the thermally shorted bolometer 1124 may be coupled to a supply voltage node 1134 at one end, and to a circuit path 1136 leading to one or more associated active bolometers 1104(1)-1104(Q) at the other end. In general, the resistance of the thermally shorted bolometer 1124 and the resistance of the active bolometer 1104 may be determined as desired for particular implementations of the bolometer circuit 1100, taking into account, for example, a supply voltage range, operating characteristics of other components of the bolometer circuit 1100, a desired range of bias, and other implementation parameters. For example, the ratio of the resistance of the resistance of the thermally shorted bolometer 1124 and the resistance of active bolometer 1104 may be set to K, such as by providing a thermally shorted bolometer 1124 having a resistance of K×Rb, where K may be any desired value for particular implementation parameters and need not be an integral number.

Thus, in one aspect, biases across a connected and enabled one of the active bolometers 1104 and the thermally shorted bolometer 1124 may be set and maintained. An inverting input 1138 of the amplifier 1126 may be coupled to a node (designated "Col") between the thermally shorted bolometer 1124 and the active bolometers 1104 on the circuit path 1136, whereas a non-inverting input 1140 of the amplifier 1126 may be provided with a reference voltage $V_{REF}$. Configured as such, a connected and enabled one of the active bolometers 1104 may be biased by an output 1142 of an offset-adjustment digital-to-analog converter (ODAC) 1144 and by the reference voltage level $V_{REF}$ appearing at the node Col.

In various embodiments, the ODAC 1144 of each column circuit block 1102 may be coupled to the supply voltage node 1134 and a common voltage node 1144, and configured to generate a desired voltage level at its output 1142 in response to offset adjustment bits 1146 (e.g., a string of binary bits indicative of a desired offset voltage). That is, the ODAC 1144 of each column circuit block 1102 may apply an adjustment to the bias across the active bolometer 1104 that is selectively enabled and electrically connected to each column circuit block 1102.

In this regard, in some embodiments, the ODAC 1144 may be used to adjust the active bolometer bias for the corresponding column circuit block 1102. In some embodiments, the ODAC 1144 may be used to apply a per-pixel adjustment of the bias across the active bolometers 1104. In such embodiments, the calibration data memory 1112 may be configured to store corresponding offset adjustment bits 1146 for every pixel (e.g., for each one of the active bolometers 1104) in the bolometer circuit 1100, and the timing and control circuit 1114 may be configured to supply corresponding offset adjustment bits 1146 to the ODAC 1144 of a corresponding one of the column circuit blocks 1102 in connection with the switching and enabling of each row of the active bolometers 1104. In various embodiments, the ODAC 1144 may include a resistor-network DAC, a CMOS DAC, or any other suitable type of DAC.

The bolometer circuit 1100 may include a bias circuit 1148 (e.g., CMOS bias circuit) coupled to the non-inverting input 1140 of the amplifier 1126 to provide the reference voltage $V_{REF}$. In an embodiment, the bias circuit 1148 may include at least a portion of the bias circuit 600 of FIG. 6. For example, the buffer 640 may provide the reference voltage $V_{REF}$ to the amplifier 1126.

With a desired level of bias applied, a resistance change due to incident infrared radiation at the active bolometers 1104 produces an amplified output voltage at an output 1150 of the amplifier 1126. The output 1150 of the amplifier 1126 is coupled to the LPF 1130, which in embodiments of the bolometer circuit 1100 may be implemented as a resistor-capacitor (RC) network LPF (as illustrated for example in FIG. 11). At the other end, the LPF 1130 is coupled to the sample-and-hold circuit 1132, which may be implemented using; one or more switches and one or more capacitors (as illustrated for example in FIG. 11) to substantially maintain filtered analog voltage level (e.g., filtered analog signal) indicative of an intensity of incident infrared radiation received at the active bolometers 1104.

In various embodiments, each column circuit block 1102 may include a comparator 1152, switches 1154, capacitors 1156, and latches 1158, which may be utilized to convert the filtered analog voltage level captured at the sample-and-hold circuit 1132 into a digital output value (e.g., by performing a ramp-compare A/D conversion). For example, the comparator 1152 may be configured to receive the voltage level from the sample-and-hold circuit 1132 and the ramp signal from the ramp generator 1116, and to compare the voltage level and the ramp signal to trigger (e.g., generate a signal to close switches 1154) when the ramp signal substantially matches the voltage level.

In this regard, the bolometer circuit 1100 may also include a counter 1160 (e.g., a digital counter in some embodiments) configured to increment (or decrement depending on the implementation of the counter 1160) a count value (e.g., encoded in one or more count signals) in response to receiving a clock signal. The count value incremented or decremented by the counter 1160 may have a substantially similar period (e.g., resets to zero or a base value at substantially the same time) as the ramp signal generated by the ramp generator 1116. When the comparator 1152 triggers, the current count value may be selected and stored in the latches 1158 as a digital value. The output of the latches 1158 of each column circuit block 1102 may be coupled to the column multiplexer 1110 configured to multiplex the digital values stored in the latches 1158 for each column circuit block 1102 to generate a digital output signal 1162 for all columns in the bolometer circuit 1100. In various embodiments, the timing and control circuit 1114, processor or other Ionic device 1120, and/or other component of the bolometer circuit 1100 may be configured to repeat generation of the digital output signal 1162 for all rows of the active bolometers 1104 according to predetermined timing, such that a concatenation of digital output signal 1162 may digitally represent an image frame of infrared radiation received at the active bolometers 1104 of the bolometer circuit 1100. Thus, for example, embodiments of the bolometer circuit 300 may be configured to capture a sequence of infrared image frames.

It is noted that FIG. 11 illustrates an example bolometer circuit including multiple columns and rows of active bolometers that form a FPA to generate analog and/or digital output of infrared imaging data. Other examples of bolometer circuits are provided, for example, in U.S. Pat. No. 10,197,448, which is hereby incorporated herein by reference. According to various embodiments, vacuum health associated with the FPA of various bolometer circuits may be detected based at least on the reference signal $V_{REF}$ associated with biasing of the active bolometers.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging device comprising:
a detector configured to generate a first reference signal;
a buffer circuit configured to store a value of the first reference signal; and
a processing circuit coupled to the buffer circuit and configured to:
determine a first predetermined value based on a first temperature associated with the detector; and
determine vacuum integrity associated with the detector based at least on the value of the first reference signal and the first predetermined value,
wherein the buffer circuit comprises:
a sample-and-hold circuit configured to receive the value of the first reference signal, wherein the processing circuit is coupled to the sample-and-hold circuit;
a buffer amplifier coupled to the detector and the sample-and-hold circuit, wherein the buffer amplifier is configured to receive the value of the first reference signal from the detector; and
a multiplexer circuit configured to:
receive the value of the first reference signal from the buffer amplifier; and
selectively provide the value of the first reference signal to the sample-and-hold circuit.

2. The imaging device of claim 1, wherein the processing circuit is configured to determine the vacuum integrity by determining a difference between the value of the first reference signal and the first predetermined value.

3. The imaging device of claim 1, further comprising a structure configured to block an incident scene from the detector, wherein the detector comprises a reference detector, the imaging device further comprising an active detector configured to receive the incident scene and generate a detection signal based on the incident scene, and wherein the first reference signal is associated with biasing of the active detector.

4. The imaging device of claim 1, wherein the sample-and-hold circuit is configured to receive the value of the first reference signal from the detector.

5. The imaging device of claim 1, wherein
the multiplexer circuit is coupled to the detector and the sample-and-hold circuit, and wherein the multiplexer circuit comprises a plurality of multiplexers.

6. The imaging device of claim 1, wherein the sample-and-hold circuit comprises a plurality of sample-and-hold components, wherein:
the detector is configured to generate a second reference signal; and
a first of the plurality of sample-and-hold components is configured to provide the value of the first reference signal to the processing circuit while a value of the second reference signal is provided to a second of the plurality of sample-and-hold components.

7. The imaging device of claim 1, further comprising:
a memory device configured to store a plurality of predetermined values, wherein the first predetermined value is one of the plurality of predetermined values, and wherein each of the plurality of predetermined values is associated with a respective temperature associated with the detector; and
a temperature sensor configured to measure the respective temperatures.

8. The imaging device of claim 1, wherein the first reference signal, the first predetermined value, and the first temperature are associated with a first line time, wherein within a second line time:
the detector is configured to generate a second reference signal;
the buffer circuit is configured to store a value of the second reference signal; and
the processing circuit is configured to:
determine a second predetermined value based on a second temperature associated with the detector; and
determine the vacuum integrity associated with the detector based at least on the value of the second reference signal and the second predetermined value.

9. An imaging device comprising:
a detector configured to generate a first reference signal;
a buffer circuit configured to store a value of the first reference signal;
a processing circuit coupled to the buffer circuit and configured to:
determine a first predetermined value based on a first temperature associated with the detector; and
determine vacuum integrity associated with the detector based at least on the value of the first reference signal and the first predetermined value; and
an analog-to-digital converter connected to the buffer circuit and configured to generate a digital count value based on the value of the first reference signal, wherein the processing circuit is coupled to the analog-to-digital converter and configured to determine the vacuum integrity based at least on the digital count value and the first predetermined value, and wherein the detector comprises a bolometer, and wherein the first temperature is a temperature of a readout circuit.

10. The imaging device of claim 9, wherein the processing circuit is configured to determine the vacuum integrity by determining a difference between the value of the first reference signal and the first predetermined value.

11. The imaging device of claim 9, further comprising a structure configured to block an incident scene from the detector, wherein the detector comprises a reference detector, the imaging device further comprising an active detector configured to receive the incident scene and generate a detection signal based on the incident scene, wherein the first reference signal is associated with biasing of the active detector.

12. The imaging device of claim 9, further comprising:
a memory device configured to store a plurality of predetermined values, wherein the first predetermined value is one of the plurality of predetermined values, and wherein each of the plurality of predetermined values is associated with a respective temperature associated with the detector; and
a temperature sensor configured to measure the respective temperatures.

13. The imaging device of claim 9, wherein the first reference signal, the first predetermined value, and the first temperature are associated with a first line time, wherein within a second line time:
the detector is configured to generate a second reference signal;
the buffer circuit is configured to store a value of the second reference signal; and
the processing circuit is configured to:
determine a second predetermined value based on a second temperature associated with the detector; and
determine the vacuum integrity associated with the detector further based at least on the value of the second reference signal and the second predetermined value.

14. A method comprising:
generating, by a detector, a first reference signal;
storing, by a buffer circuit, a value of the first reference signal;
determining, by a processing circuit, a first predetermined value based on a first temperature associated with the detector; and
determining, by the processing circuit, vacuum integrity associated with the detector based at least on the value of the first reference signal and the first predetermined value,
wherein the storing comprises receiving, by a sample-and-hold circuit of the buffer circuit, the value of the first reference signal, wherein the sample-and-hold circuit is coupled to the processing circuit,
wherein the storing further comprises receiving, by a multiplexer circuit of the buffer circuit, the value of the first reference signal from the detector, and wherein the multiplexer circuit is coupled to the detector and the sample-and-hold circuit.

15. The method of claim 14, wherein the determining the vacuum integrity comprises determining a difference between the value of the first reference signal and the first predetermined value.

16. The method of claim 14, wherein the detector has a structure disposed thereon to block an incident scene from the detector, wherein the detector comprises a reference detector, the method further comprising:
receiving, by an active detector, the incident scene; and
generating, by the active detector, a detection signal based on the incident scene, wherein the first reference signal is associated with biasing of the active detector.

17. The method of claim 14, wherein the storing further comprises:
receiving, by a buffer amplifier of the buffer circuit, the value of the first reference signal from the detector, wherein the buffer amplifier is coupled to the sample-and-hold circuit, and wherein the storing further comprises:
receiving the value of the first reference signal from the buffer amplifier; and
selectively providing, by the multiplexer circuit, the value of the first reference signal to the sample-and-hold circuit.

18. The method of claim 14, further comprising:
generating, by the detector, a second reference signal; and
providing, by a first sample-and-hold component of the sample-and-hold circuit, the value of the first reference signal to the processing circuit while providing a value of the second reference signal to a second sample-and-hold component of the sample-and-hold circuit.

19. The method of claim 14, further comprising generating, by an analog-to-digital converter, a digital count value based on the value of the first reference signal, wherein the determining the vacuum integrity is based at least on the digital count value and the first predetermined value.

20. The method of claim 14, wherein the first reference signal, the first predetermined value, and the first temperature are associated with a first line time, the method further comprising within a second line time:
generating, by the detector, a second reference signal;
storing, by the buffer circuit, a value of the second reference signal;
determining, by the processing circuit, a second predetermined value based on a second temperature associated with the detector;
determining, by the processing circuit, vacuum integrity associated with the detector based at least on the value of the second reference signal and the second predetermined value; and
measuring a temperature associated with the detector.

* * * * *